(12) United States Patent
Hirman

(10) Patent No.: US 10,370,193 B2
(45) Date of Patent: Aug. 6, 2019

(54) FOLDING CONVEYER FOR A CONSTRUCTION MACHINE

(71) Applicant: Caterpillar Paving Products Inc., Brooklyn Park, MN (US)

(72) Inventor: Colton Hirman, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/810,315

(22) Filed: Nov. 13, 2017

(65) Prior Publication Data

US 2019/0144208 A1    May 16, 2019

(51) Int. Cl.
*B65G 21/14*    (2006.01)
*B65G 41/00*    (2006.01)
*E01C 23/088*   (2006.01)

(52) U.S. Cl.
CPC ............ *B65G 21/14* (2013.01); *B65G 41/002* (2013.01); *E01C 23/088* (2013.01)

(58) Field of Classification Search
CPC ...... B65G 41/00; B65G 21/10; B65G 41/002; B65G 21/12; B65G 19/287
USPC .......... 198/313, 581, 584, 632, 861.2, 861.5
See application file for complete search history.

(56) References Cited

U.S. PATENT DOCUMENTS

| | | | |
|---|---|---|---|
| 7,347,311 B2 | 3/2008 | Rudge | |
| 7,806,254 B2 * | 10/2010 | Brayman | B65G 21/06 198/461.1 |
| 9,997,286 B2 * | 6/2018 | Herman | H01F 7/0205 |
| 2007/0267273 A1 | 11/2007 | Walsh et al. | |
| 2009/0070954 A1 * | 3/2009 | Torno | E01H 1/0854 15/340.1 |
| 2009/0267402 A1 | 10/2009 | Berning et al. | |
| 2016/0137422 A1 | 5/2016 | Husar et al. | |
| 2017/0130405 A1 * | 5/2017 | Engelmann | B60R 1/00 |

FOREIGN PATENT DOCUMENTS

| | | |
|---|---|---|
| CN | 104213498 | 12/2014 |
| CN | 204212036 | 3/2015 |

* cited by examiner

*Primary Examiner* — Gene O Crawford
*Assistant Examiner* — Lester Rushin, III
(74) *Attorney, Agent, or Firm* — Oblon, McClelland, Maier & Neustadt

(57) ABSTRACT

A construction machine is provided. The machine includes a frame and a power source mounted on the frame. The machine also includes a milling drum configured to be driven by the power source. The machine further includes a conveyor mounted on the frame. The conveyer includes a first conveyor portion having a first end and a second end. The first end is mounted on the frame. The conveyer also includes a second conveyor portion having a third end and a fourth end. The third end is mounted on the second end of the first conveyor portion. The second conveyor portion is configured to move between a working position and a stowed position. The conveyer further includes a magnet member secured to one of the first and second conveyor portion. The magnet member is configured to couple the second conveyor portion to the first conveyor portion in the stowed position.

20 Claims, 5 Drawing Sheets

FOLDING CONVEYER FOR A CONSTRUCTION MACHINE

TECHNICAL FIELD

The present disclosure relates to a folding conveyer for a construction machine. More particularly, the present disclosure relates to a coupling mechanism for the folding conveyor of the construction machine.

BACKGROUND

A machine, such as a cold planar, may typically include a conveyor installed therein. The conveyor may be employed for receiving material from a cutting tool of the machine, and further conveying the received material out of the machine or to another section of the machine. The conveyor may be folded during travel and transport of the machine to reduce an effective size of the machine.

The conveyer may include hydraulic cylinders for folding the conveyer. In many situations, the machine may employ counterbalance valves for the hydraulic cylinders to hold the conveyor in a folded position. The retention provided by the conveyor hydraulic cylinders may not be adequate to hold the conveyer in the folded position, and in many situations, may result in leakage of hydraulic fluid from the hydraulic system. Hence, there is a need for an improved coupling mechanism for such a folding conveyor.

U.S. Pat. No. 7,347,311 describes a mechanism for a foldable vehicle conveyor having an axis, inner and outer sections and a joint connecting the sections. The outer section is pivotable between a deployed position and a folded position at which the outer section is disposed above the inner section. A linkage displaces the outer section between the two positions and includes a drive link pivotable on the inner section. A connector link is pivotably connected with the drive link and with the outer section. The linkage moves between a deployed limit position where the drive link centerline extends parallel to the conveyor axis and the connector link centerline extends perpendicularly to the conveyor axis. A folded limit position where the drive link centerline is generally perpendicular to the conveyor axis and the connector link centerline is generally parallel to and above the conveyor axis. An actuator displaces the linkage between the two positions.

SUMMARY OF THE DISCLOSURE

In an aspect of the present disclosure, a construction machine is provided. The machine includes a frame. The machine includes a power source mounted on the frame. The machine also includes a milling drum configured to be driven by the power source. The machine further includes a conveyor mounted on the frame. The conveyer includes a first conveyor portion having a first end and a second end opposite to the first end. The first end is configured to be mounted on the frame. The conveyer also includes a second conveyor portion having a third end and a fourth end opposite to the third end. The third end is configured to be pivotally mounted on the second end of the first conveyor portion. The second conveyor portion is configured to selectively move between a working position and a stowed position. The conveyer further includes a magnet member secured to at least one of the first conveyor portion and the second conveyor portion. The magnet member is configured to selectively couple the second conveyor portion to the first conveyor portion in the stowed position.

In another aspect of the present disclosure, a folding conveyor associated with a construction machine is provided. The folding conveyer includes a first conveyor portion and a second conveyor portion pivotally mounted to the first conveyor portion. The folding conveyer further includes a coupling mechanism. The coupling mechanism includes a magnet member secured to at least one of the first conveyor portion and the second conveyor portion. The magnet member is configured to selectively couple the second conveyor portion to the first conveyor portion in a stowed position of the conveyor.

In yet another aspect of the present disclosure, a method of securing a conveyer of a construction machine in a working position and a stowed position is provided. The conveyor has a first conveyer portion and a second conveyer portion. The second conveyor portion is pivotally mounted on the first conveyer portion. The method includes pivotally moving the second conveyer portion with respect to the first conveyer portion. The method also includes aligning the second conveyor portion adjacent and longitudinally spaced apart with respect to the first conveyor portion. The method further includes removably coupling the second conveyer portion with the first conveyor portion using a magnet member positioned on at least one of the first conveyer portion and the second conveyer portion.

Other features and aspects of this disclosure will be apparent from the following description and the accompanying drawings.

DETAILED DESCRIPTION

Figure 1:
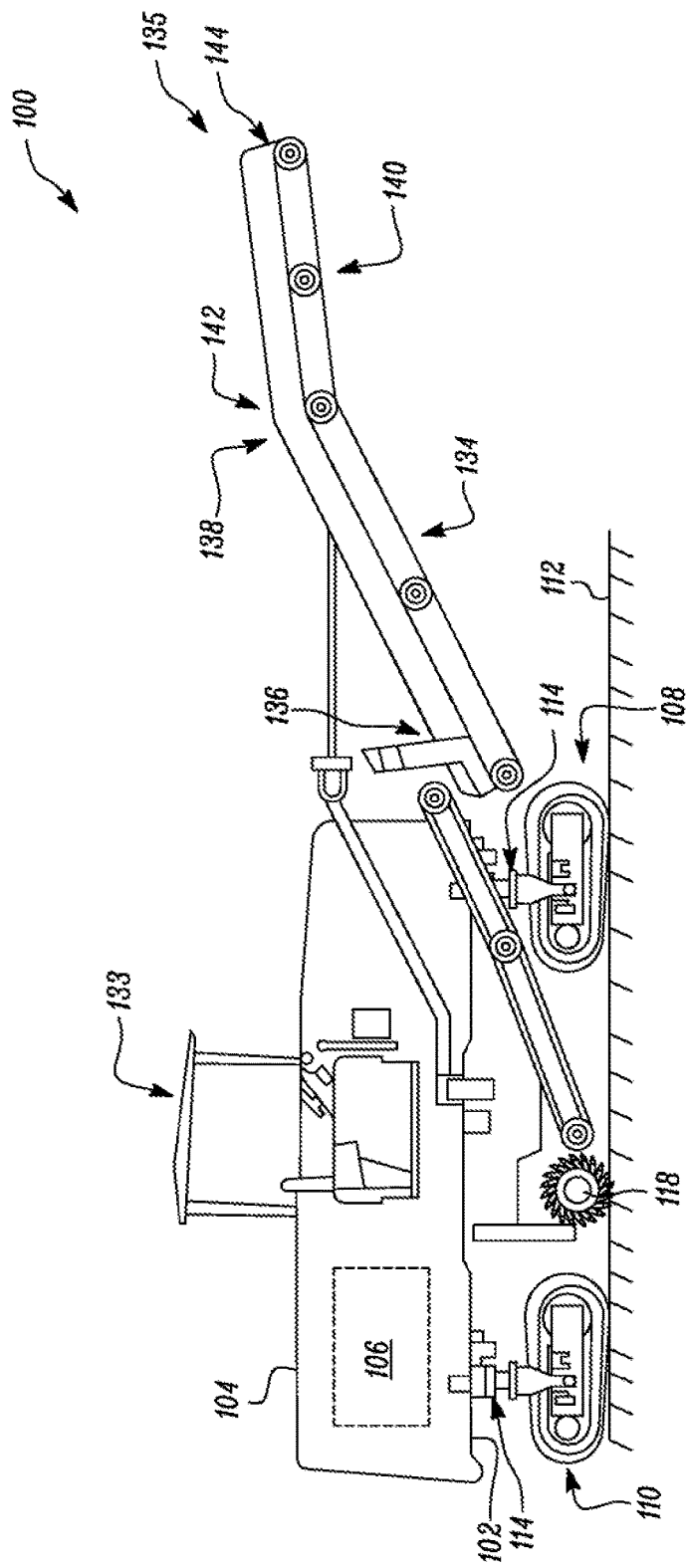
FIG. 1 is a side view of an exemplary machine, according to one embodiment of the present disclosure.
Figure 2:
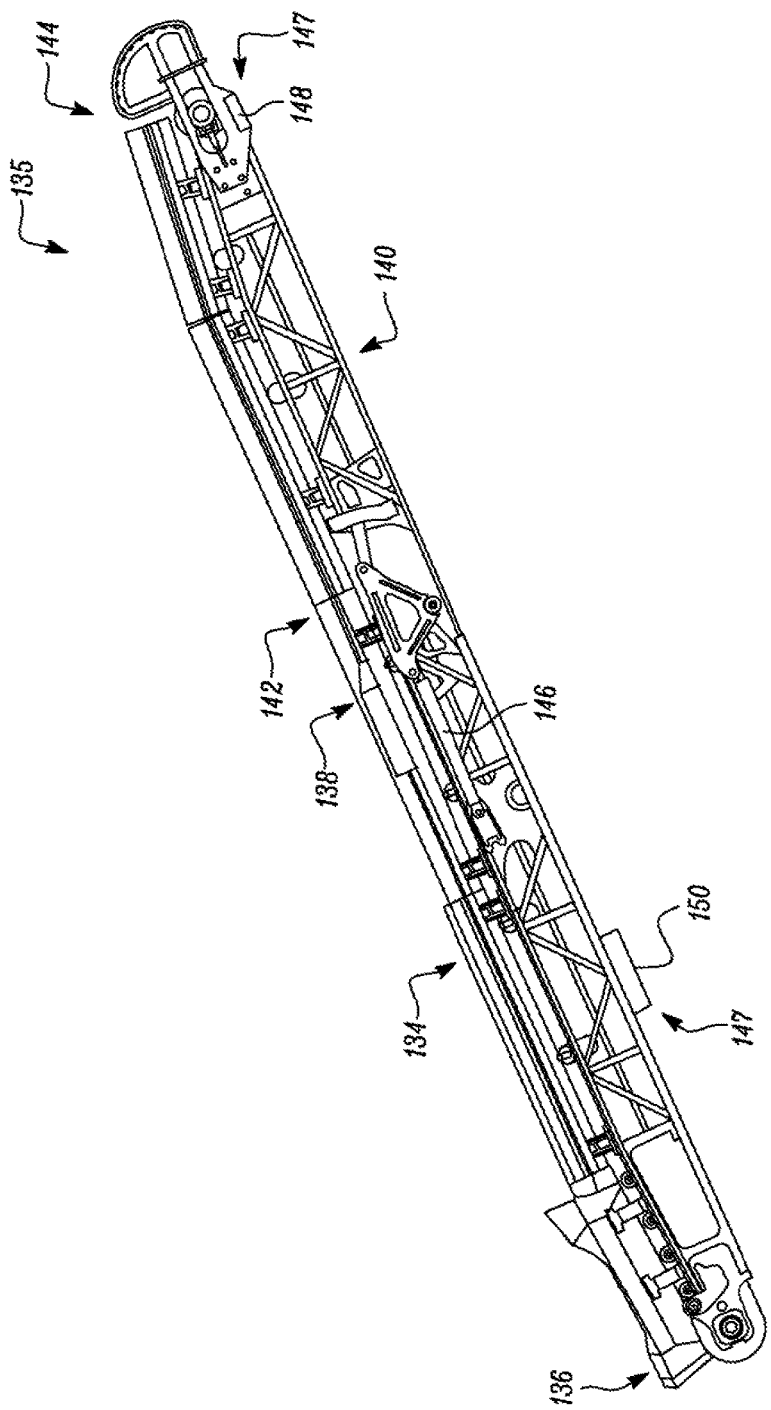
FIG. 2 is a side view of a conveyor of the machine of FIG. 1 in a working position, according to one embodiment of the present disclosure.
Figure 3:
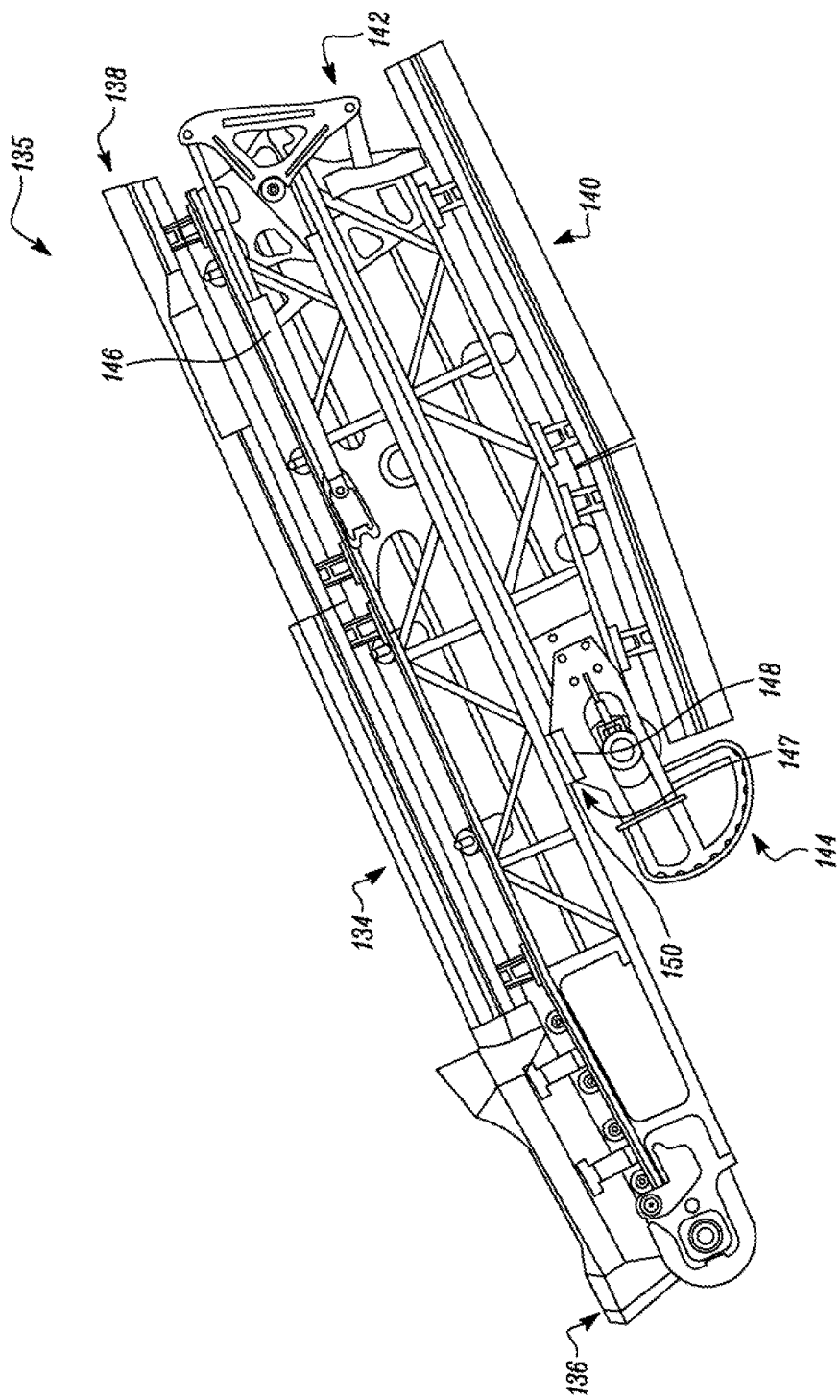
FIG. 3 is a side view of the conveyor of FIG. 2 in a stowed position, according to one embodiment of the present disclosure.
Figure 4:
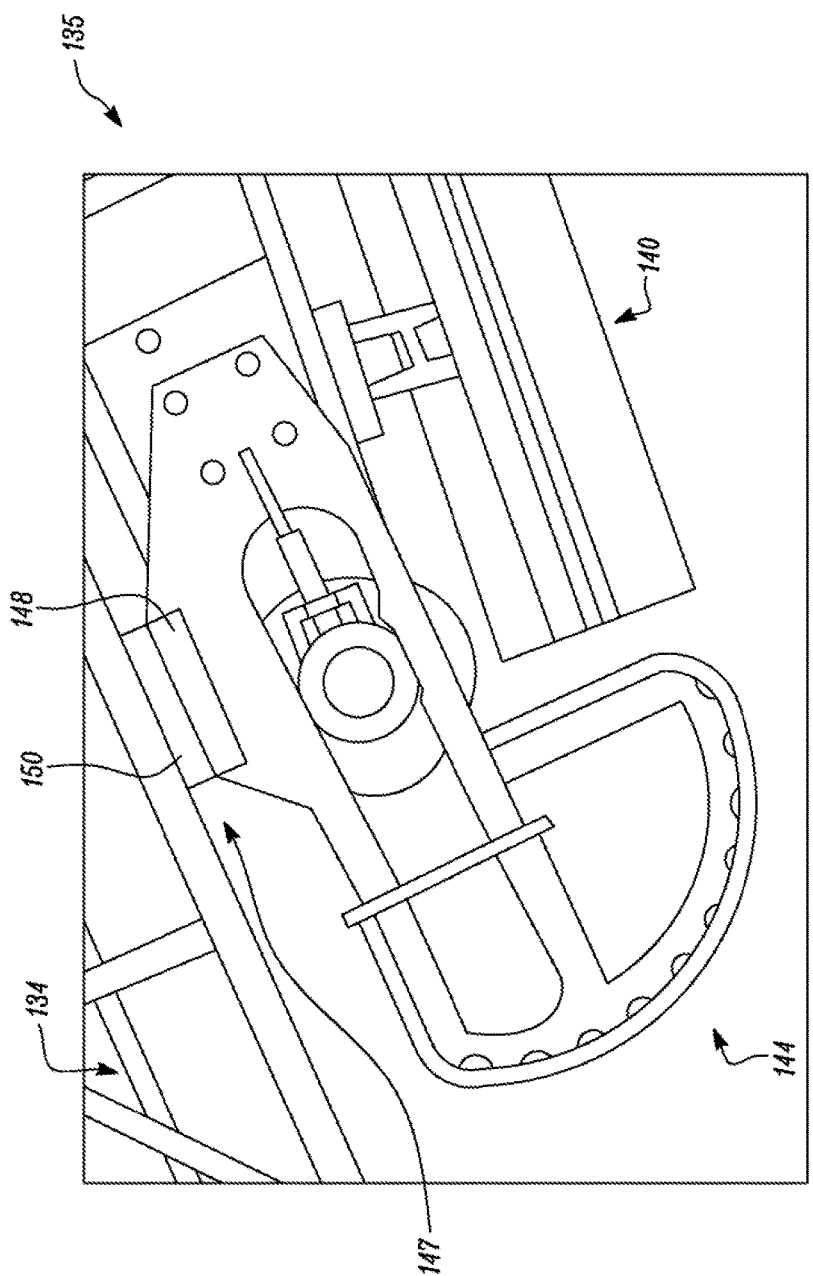
FIG. 4 is a side view of a coupling mechanism of the conveyor of FIG. 2, according to one embodiment of the present disclosure.

Wherever possible, the same reference numbers will be used throughout the drawings to refer to the same or the like parts. Referring to FIG. 1, an exemplary construction machine 100 is illustrated. More specifically, the machine 100 is a cold planar. The machine 100 includes a frame 102. The frame 102 is configured to support one or more components of the machine 100. The machine 100 includes an enclosure 104 mounted on the frame 102. The enclosure 104 is configured to house a power source 106 mounted on the frame 102 therein. The power source 106 is configured to provide power to the machine 100 for mobility and operational requirements. The power source 106 may be any power source known in the art including, but not limited to, an internal combustion engine, a motor, batteries, and/or a combination thereof.

The machine 100 includes a pair of laterally spaced front track assemblies 108 and a pair of laterally spaced rear track assemblies 110 mounted on the frame 102 (only two of four track assemblies are shown in FIG. 1). It will be appreciated by those skilled in the art that the front track assemblies 108 are substantially identical, and the rear track assemblies 110 are also substantially identical, so the front rack assembly 108 and the rear track assembly 110 shown in FIG. 1 and described herein are representative of those track assemblies not shown. Each of the front track assemblies 108 and the rear track assemblies 110 are configured to support and provide mobility to the machine 100 on ground 112. The machine 100 includes hydraulic struts 114 extending between the frame 102 and each of the front track assembly 108 and the rear track assembly 110 respectively. Each of the hydraulic struts 114 is configured to selectively extend and retract in order to raise and lower the machine 100 with respect to the ground 112 respectively.

The machine 100 also includes a milling drum 118 rotatably mounted on the frame 102. The milling drum 118 may include a plurality of cutting elements (not shown) provided thereon, such as cutting teeth. The milling drum 118 is configured to remove material from the ground 112 including, but not limited to an asphalt surface and a paved surface, by cutting, scraping, milling, and so on. A depth of a cut or penetration of the cutting teeth of the milling drum 118 may be controlled by appropriate extension or retraction of each of the hydraulic struts 114.

The milling drum 118 may be selectively coupled to the power source 106 using a transmission system (not shown). In the illustrated embodiment, the transmission system includes a driver pulley (not shown) operably coupled to the power source 106, a driven pulley (not shown) operably coupled to the milling drum 118, a belt (not shown) operably coupled to each of the driver pulley and the driven pulley, and a belt tensioner (not shown) operably coupled to the belt. In other embodiments, the transmission system may include any power transmission system known in the art, such as a gear train, a clutch system, a hydraulic system, and so on.

Additionally, the machine 100 may also include a housing (not shown) mounted on the frame 102. The housing may be configured to at least partially surround the milling drum 118. The housing may be made up of multiple components configured to contain and remove the material of the ground 112 that may be ground up by the milling drum 118. Each of the components may be vertically positioned in order to account for the depth to which the milling drum 118 may dig into the ground 112. For example, the housing may include a side plate (not shown) disposed on opposing sides of the milling drum 118. The side plate may be selectively raised and lowered in order to provide a visual depth reference as the machine 100 may move on the ground 112 as well as to provide a lateral enclosure to the milling drum 118 and to contain the removed material.

The housing may also include a moldboard (not shown) disposed behind the milling drum 118 with respect to a direction of travel of the machine 100. The moldboard, when in a closed or operating position, may be positioned at a depth lower than the side plate in order to scrape up loose removed material and clean the ground 112. As such, minimal additional cleanup may be required after the machine 100 may pass over the ground 112. The housing may also include an anti-slab (not shown) disposed in front of the milling drum 118 with respect to the direction of travel of the machine 100. The anti-slab may be positioned above the ground 112 in order to break up the material and limit lifting up large chunks of the material by the milling drum 118 that may not be readily conveyable. The machine 100 further includes an operator cabin 133 mounted on the frame 102. The operator cabin 133 may include a control console (not shown) having required instruments in order to allow an operator to control an operation of various components of the machine 100.

Referring to FIGS. 1 to 4, the machine 100 also includes a conveyer 135. The conveyer 135 is hereinafter interchangeably referred to as a "folding conveyer 135". The conveyer 135 includes a first conveyor portion 134 mounted on the frame 102. The first conveyor portion 134 includes a first end 136 and a second end 138 thereof. The second end 138 is distal with respect to the first end 136. The first end 136 is adapted to be mounted on the frame 102. The first conveyor portion 134 is configured to receive the removed material at the first end 136 thereof from the milling drum 118 and deliver the received material from the second end 138 thereof to a second conveyor portion 140. The second conveyor portion 140 portion includes a third end 142 and a fourth end 144 opposite to the third end 142. The third end 142 is adapted to be pivotally mounted on the second end 138 of the first conveyor portion 134. The second conveyor portion 140 is adapted to selectively move between a working position (shown in FIGS. 1 and 2) and a stowed position (shown in FIG. 3).

The conveyer 135 includes one or more hydraulic cylinders 146 operably coupled to the first conveyor portion 134 and the second conveyor portion 140. The hydraulic cylinders 146 are controlled via the control console. The hydraulic cylinders 146 enable the second conveyor portion 140 to selectively move with respect to the first conveyor portion 134 between the working position and the stowed position.

The conveyer 135 further includes a coupling mechanism 147 to hold the conveyer 135 in the stowed position. The coupling mechanism 147 includes a magnet member 148 secured to at least one of the first conveyor portion 134 and the second conveyor portion 140. A specification of the magnet member 148 including, but not limited to, size, shape and magnetic properties may vary based on a specification of the conveyer 135 and/or the machine 100. The magnet member 148 is any one of a permanent magnet and an electromagnet, known in the art. In one embodiment, the electromagnet may be electrically connected to an electrical power source (not shown) associated with the machine 100 in order to receive electrical power for an operation thereof. In another embodiment, the electromagnet may be electrically connected to an external electrical power source. The magnet member 148 is secured to the one of the first conveyer portion 134 and the second conveyer portion 140 using coupling methods including, but not limited to, welding, bolting, and riveting.

The magnet member 148 is configured to selectively couple the second conveyor portion 140 to the first conveyor portion 134 in the stowed position. In order to couple the second conveyor portion 140 to the first conveyor portion 134 in the stowed position, the second conveyer portion 140 may be moved pivotally with respect to the first conveyer portion 134. The hydraulic cylinder 146 may be actuated to move the second conveyer portion 140 pivotally with respect to first conveyor portion 134. Further, the second conveyer portion 140 may be aligned adjacent and longitudinally spaced apart with respect to the first conveyer portion 134 to attain the stowed position. Once the second conveyer portion 140 may attain the stowed position, the magnet member 148 may be activated in a situation when the magnet member 148 may be the electromagnet. In a situation, when the magnet member 148 may be the permanent magnet, the magnet member 148 may be permanently activated. Then, the second conveyer portion 140 may be removably coupled with the first conveyer portion 134 using the magnet member 148 positioned on one of the first conveyer portion 134 and the second conveyer portion 140.

In one embodiment, the coupling mechanism 147 further includes an attachment member 150. The attachment member 150 is secured to any one of the first conveyer portion 134 and the second conveyer portion 140. A location of the attachment member 150 is different with respect to a location of the magnet member 148. More particularly, the attachment member 150 is secured at the first conveyer portion 134 if the magnet member 148 is secured at the second conveyer portion 140. Alternatively, the attachment member 150 is secured at the second conveyer portion 140 if the magnet member 148 is secured at the first conveyer portion 134. The attachment member 150 is configured to receive the magnet member 148 thereon. It may be contemplated that a shape of the attachment member 150 may vary based on a shape of the magnet member 148. The attachment member 150 may be any one of a ferromagnet, a ferrimagnet, a permanent magnet, and an electromagnet adapted to be removably joined to the magnet member 148 due to magnetic attraction. In another embodiment, a frame of the conveyer 135 may itself act as the attachment member 150.

In order to switch from the stowed position to the working position, the second conveyer portion 140 is selectively decoupled with respect to the first conveyer portion 134 using at least one of hydraulic force and deactivation of the electrical power supplied by the electrical power source. More specifically, the hydraulic cylinder 146 may be activated to decouple the magnet member 148 with respect to the attachment member 150 or the frame of the conveyer 135 using force of separation. Additionally, or optionally, the electrical power to the electromagnet may be deactivated in order to decouple the magnet member 148 with respect to the attachment member 150 or the frame of the conveyer 135. It may be noted that, in some embodiments, the machine 100 may include a supplementary power supply system (not shown) for providing the electrical power to the magnet member 148 to hold the second conveyer portion 140 in the stowed position, while the machine 100 may be turned off and the electrical power source may not deliver the electrical power to the magnet member 148.

INDUSTRIAL APPLICABILITY

Figure 5:
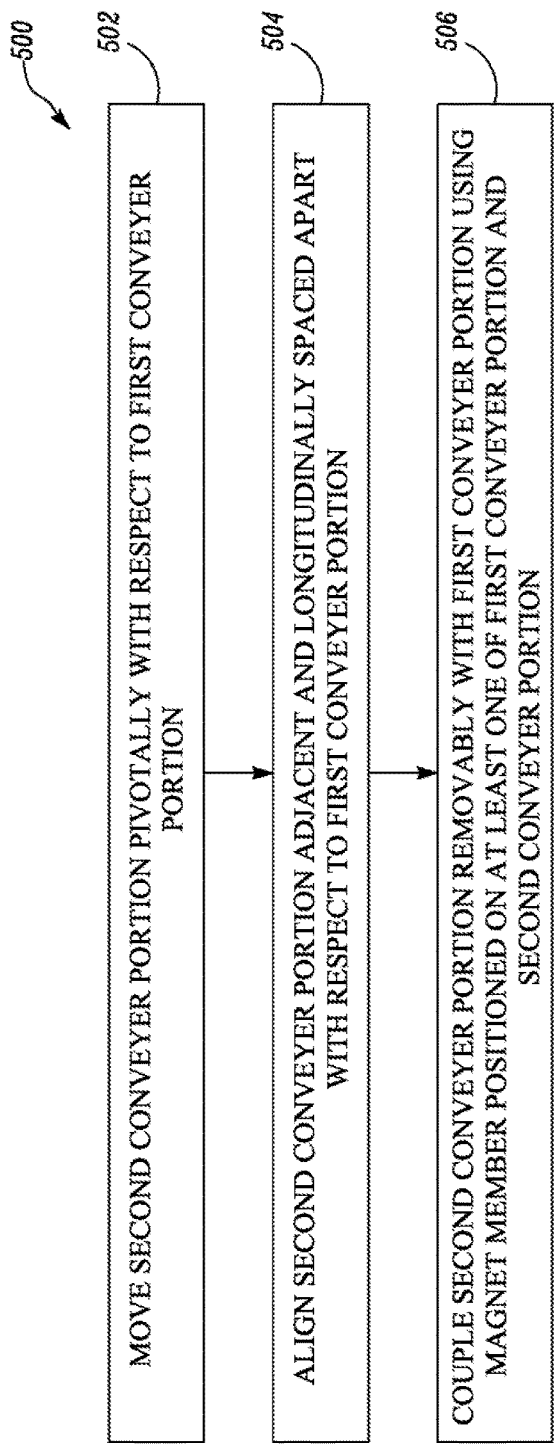
FIG. 5 is a flowchart illustrating a method of securing a conveyer of the construction machine of FIG. 1 in a folded position and a stowed position, according to one embodiment of the present disclosure.

The present disclosure relates to a method 500 of securing the conveyer 135 of the machine 100 in the working position and the stowed position. Referring to FIG. 5, a flowchart of the method 500 is illustrated. The method 500 will now be explained in detail with reference to FIGS. 2 to 4. The conveyer 135 includes the first conveyer portion 134 and the second conveyer portion 140. The second conveyer portion 140 is pivotally mounted on the first conveyer portion 134.

At step 502, the second conveyer portion 140 is moved pivotally with respect to the first conveyer portion 134. The second conveyer portion 140 is moved using the hydraulic cylinder 146 operatively coupled to the conveyer 135. Further, at step 504, the second conveyer portion 140 is aligned adjacent and longitudinally spaced apart with respect to the first conveyer portion 134. More particularly, the attachment member 150 is aligned adjacent and spaced apart with respect to the magnet member 148, based on the locations of the attachment member 150 and the magnet member 148.

At step 506, the second conveyer portion 140 is removably coupled with the first conveyer portion 134 using the magnet member 148 positioned on one of the first conveyer portion 134 and the second conveyer portion 140. More particularly, the electrical power is provided to the magnet member 148 in case of the electromagnet being the magnet member 148. Further, the attachment member 150 is removably coupled with the magnet member 148.

Further, in order to turn the conveyer 135 from the stowed position to the working position, the second conveyer portion 140 is decoupled with respect to the first conveyer portion 134. In one example, the second conveyer portion 140 is decoupled from the first conveyer portion 134 using the hydraulic force provided by the hydraulic cylinder 146. In another example, the second conveyer portion 140 is decoupled from the first conveyer portion 134 by deactivating the electrical power provided to the magnet member 148. Further, the second conveyer portion 140 is pivotally moved with respect to the first conveyer portion 134 using the hydraulic force.

The coupling mechanism 147 provides a simple, efficient, and cost effective method of securing the conveyer 135 of the machine 100 in the working and stowed position of the first conveyor portion 134 with respect to the frame 102 of the machine 100. The magnet member 148 and the attachment member 150 may provide an increased retention while travel and transport of the machine 100. Also, the coupling mechanism 147 may be retrofitted on any folding conveyor with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A construction machine comprising:
   a frame;
   a power source mounted on the frame;
   a milling drum configured to be driven by the power source; and
   a conveyor mounted on the frame, the conveyer including:
   a first conveyor portion having a first end and a second end opposite to the first end, the first end configured to be mounted on the frame;
   a second conveyor portion having a third end and a fourth end opposite to the third end, the third end configured to be pivotally mounted on the second end of the first conveyor portion, the second conveyor portion configured to selectively move between a working position and a stowed position; and
   a magnet member secured to at least one of the first conveyor portion and the second conveyor portion, the magnet member configured to selectively couple the second conveyor portion to the first conveyor portion only in the stowed position,
   wherein, in the stowed position, when the second conveyor portion is selectively coupled to the first conveyor portion via the magnet member, the second conveyor portion hangs from an underside of the first conveyor portion.

2. The construction machine of claim 1, wherein the magnet member is any one of a permanent magnet and an electromagnet.

3. The construction machine of claim 2, wherein the electromagnet is electrically coupled to at least one of an electrical power source associated with the construction machine and an external electrical power source.

4. The construction machine of claim 2, wherein the second conveyor portion is selectively decoupled with respect to the first conveyor portion using at least one of hydraulic force and deactivation of electrical power.

5. The construction machine of claim 1,
wherein the magnet member is an electromagnet, and
wherein the second conveyor portion is selectively decoupled with respect to the first conveyor portion responsive to deactivation of the electromagnet.

6. The construction machine of claim 1 further includes an attachment member secured to any one of the first conveyor portion and the second conveyor portion in association with the magnet member, a location of the attachment member being different with respect to a location of the magnet member.

7. The construction machine of claim 6, wherein the attachment member is any one of a ferromagnet, a ferrimagnet, a permanent magnet, and an electromagnet.

8. A folding conveyor associated with a construction machine, the folding conveyor comprising:
a first conveyor portion;
a second conveyor portion pivotally mounted to the first conveyor portion; and
a coupling mechanism including:
a magnet member secured to at least one of the first conveyor portion and the second conveyor portion, the magnet member configured to selectively couple the second conveyor portion to the first conveyor portion only in a stowed position of the conveyor,
wherein, in the stowed position, when the second conveyor portion is selectively coupled to the first conveyor portion via the magnet member, the second conveyor portion hangs from an underside of the first conveyor portion.

9. The folding conveyor of claim 8, wherein the magnet member is any one of a permanent magnet and an electromagnet.

10. The folding conveyor of claim 9, wherein the electromagnet is electrically coupled to at least one of an electrical power source associated with the construction machine and an external electrical power source.

11. The folding conveyor of claim 9, wherein the second conveyor portion is selectively decoupled with respect to the first conveyor portion using at least one of hydraulic force and deactivation of electrical power.

12. The folding conveyor of claim 8, wherein the magnet member is secured to at least one of the first conveyor portion and the second conveyor portion using at least one of welding, bolting, and riveting.

13. The folding conveyor of claim 8 further includes an attachment member secured to any one of the first conveyor portion and the second conveyor portion in association with the magnet member, a location of the attachment member being different with respect to a location of the magnet member.

14. The folding conveyor of claim 13, wherein the attachment member is any one of a ferromagnet, a ferrimagnet, a permanent magnet, and an electromagnet.

15. A method of securing a conveyer of a construction machine in a folded position and a stowed position, the conveyor having a first conveyor portion and a second conveyor portion, the second conveyor portion being pivotally mounted on the first conveyor portion, the method comprising:
moving, pivotally, the second conveyer portion with respect to the first conveyor portion;
aligning, adjacent and longitudinally spaced apart, the second conveyer portion with respect to the first conveyer portion; and
coupling, removably, the second conveyer portion with the first conveyer portion using a magnet member positioned on at least one of the first conveyor portion and the second conveyor portion,
wherein, in the stowed position, when the second conveyor portion is selectively coupled to the first conveyor portion via the magnet member, the second conveyor portion hangs from an underside of the first conveyor portion.

16. The method of claim 15, wherein coupling the second conveyer portion with the first conveyer portion further includes:
providing an attachment member on any one of the first conveyer portion and the second conveyer portion in association with the magnet member, a location of the attachment member being different with respect to a location of the magnet member, and
coupling, removably, the attachment member with the magnet member.

17. The method of claim 16, wherein aligning the second conveyer portion with respect to the first conveyer portion further includes:
aligning, adjacent and spaced apart, the attachment member with respect to the magnet member.

18. The method of claim 15, wherein coupling the second conveyer portion with the first conveyer portion further includes:
providing electrical power to the magnet member.

19. The method of claim 18 further comprising:
decoupling the second conveyer portion with respect to the first conveyer portion using at least one of hydraulic force and deactivation of the electrical power.

20. The method of claim 15, wherein the second conveyer portion is pivotally moved with respect to the first conveyer portion using hydraulic force.

* * * * *